(12) United States Patent
Weh et al.

(10) Patent No.: US 12,427,958 B2
(45) Date of Patent: Sep. 30, 2025

(54) HYDRAULIC BLOCK FOR A HYDRAULIC UNIT OF A HYDRAULIC VEHICLE POWER BRAKING SYSTEM

(71) Applicant: Robert Bosch GmbH, Stuttgart (DE)

(72) Inventors: Andreas Weh, Sulzberg (DE); Juergen Tandler, Fuessen (DE); Matthias Mayr, Rettenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 397 days.

(21) Appl. No.: 17/789,306

(22) PCT Filed: Dec. 9, 2020

(86) PCT No.: PCT/EP2020/085221
§ 371 (c)(1),
(2) Date: Jun. 27, 2022

(87) PCT Pub. No.: WO2021/164917
PCT Pub. Date: Aug. 26, 2021

(65) Prior Publication Data
US 2023/0048099 A1 Feb. 16, 2023

(30) Foreign Application Priority Data
Feb. 18, 2020 (DE) ............. 10 2020 202 048.5

(51) Int. Cl.
*B60T 17/04* (2006.01)
*B60T 8/36* (2006.01)
*B60T 8/40* (2006.01)

(52) U.S. Cl.
CPC .............. *B60T 8/368* (2013.01); *B60T 8/409* (2013.01); *B60T 2270/88* (2013.01)

(58) Field of Classification Search
CPC ....... B60T 8/368; B60T 8/409; B60T 2270/88
USPC ............. 303/119.3; 137/596.17, 596.18, 597
See application file for complete search history.

(56) References Cited

U.S. PATENT DOCUMENTS

| | | | |
|---|---|---|---|
| 2015/0123459 A1 | 5/2015 | Otake | |
| 2019/0031164 A1* | 1/2019 | Tandler | B60T 8/368 |
| 2023/0256953 A1* | 8/2023 | Weh | F15B 15/02 |
| | | | 137/597 |
| 2023/0256954 A1* | 8/2023 | Weh | B60T 17/04 |
| | | | 137/597 |

FOREIGN PATENT DOCUMENTS

| | | |
|---|---|---|
| CN | 101687496 A | 3/2010 |
| CN | 104884316 A | 9/2015 |
| CN | 105000011 A | 10/2015 |
| CN | 106458179 A | 2/2017 |
| DE | 102013209727 A1 | 11/2014 |
| DE | 102015205543 A1 | 9/2016 |
| DE | 102016202113 A1 | 8/2017 |
| JP | 2016088227 A | 5/2016 |
| KR | 20180094356 A | 8/2018 |

OTHER PUBLICATIONS

International Search Report for PCT/EP2020/085221, Issued Feb. 16, 2021.

* cited by examiner

*Primary Examiner* — Christopher P Schwartz
(74) *Attorney, Agent, or Firm* — NORTON ROSE FULBRIGHT US LLP

(57) ABSTRACT

Boring of a hydraulic block of vehicle power braking system.

15 Claims, 3 Drawing Sheets

HYDRAULIC BLOCK FOR A HYDRAULIC UNIT OF A HYDRAULIC VEHICLE POWER BRAKING SYSTEM

FIELD

The present invention relates to a hydraulic block for a hydraulic unit of a hydraulic vehicle power braking system.

BACKGROUND INFORMATION

German Patent Application No. DE 10 2016 202 113 A1 describes a narrow, cuboidal hydraulic block for a hydraulic unit of a slip-controlled, hydraulic vehicle power braking system, in which a master brake cylinder bore is continuously provided from one narrow side to an oppositely situated narrow side, and a power cylinder bore perpendicular to the master brake cylinder bore is likewise continuously provided through two oppositely situated large sides of the hydraulic block. In addition, the conventional hydraulic block includes a blind hole as a receptacle for a pedal travel simulator. For the powered generation of brake pressure, a power piston is displaceable in the power cylinder bore via a ball screw drive, using an electric motor. The electric motor is situated on the outside of the hydraulic block, coaxially with respect to the power cylinder bore, and the ball screw drive is situated between the electric motor and the power piston, likewise coaxially with respect to the electric motor and the power cylinder bore. The electric motor and the ball screw drive form power drive, and together with the power piston and the power cylinder bore form a power brake pressure generator for the hydraulic vehicle braking system.

SUMMARY

A hydraulic block according to the present invention is provided for a hydraulic unit of a hydraulic vehicle power braking system. In accordance with an example embodiment of the present invention, the hydraulic unit is preferably subdivided into multiple modules, each of which includes a hydraulic block, and which may be accommodated at various locations in an engine compartment or at some other location in a motor vehicle. The normally cuboidal hydraulic blocks are interconnected via brake lines, and hydraulic wheel brakes are connected to one of the hydraulic blocks via brake lines.

The hydraulic block is used to mechanically fasten and hydraulically interconnect hydraulic components of the vehicle braking system. Such hydraulic components include solenoid valves, check valves, hydraulic accumulators, damper chambers, and pressure sensors, among others. The hydraulic components are fastened in receptacles in the hydraulic block, which are usually formed as cylindrical counterbores, blind holes, or through holes, sometimes with stepped diameters. "Interconnected" means that the receptacles or the hydraulic components fastened in them are connected via lines in the hydraulic block corresponding to a hydraulic circuit diagram of the vehicle braking system. However, the lines are typically not necessarily bored in the hydraulic block.

The hydraulic block, equipped with the hydraulic components of the vehicle braking system or its slip control system, forms the hydraulic unit, "equipped" meaning that the hydraulic components are fastened in the receptacles of the hydraulic block respectively provided for them.

The present invention is directed in particular to the arrangement of hydraulic components or their receptacles and their hydraulic connection in the hydraulic block.

The hydraulic block according to an example embodiment of the present invention includes one or more connections for a brake fluid reservoir at an upper side of the hydraulic block. The upper side is in particular a narrow side of the hydraulic block, which in a designated installation and use position of the hydraulic block is located at the top, and on which on the brake fluid reservoir is situated. The connection for the brake fluid reservoir is in particular a counterbore into which a connection nipple protruding from a base of the brake fluid reservoir is or becomes inserted in a liquid-tight manner. The brake fluid reservoir preferably includes multiple connection nipples, and the upper side of the hydraulic block according to the present invention includes connections with a matching arrangement.

In addition, the hydraulic block according to an example embodiment of the present invention includes a master brake cylinder bore which in particular is situated in the hydraulic block in parallel to the upper side of the hydraulic block, and which in particular opens into a narrow side of the hydraulic block adjoining the upper side. One or more multiple master brake cylinder pistons for generating a brake pressure are axially displaceably situatable in the master brake cylinder bore. The master brake cylinder pistons may be guided directly in the master brake cylinder bore, or indirectly in a cylinder bushing situated in the master brake cylinder bore. One of the master brake cylinder pistons is articulatedly connected to a foot brake pedal or a hand brake lever via a piston rod, and in this way may be moved in the master brake cylinder bore by muscular power. The muscular power may be intensified by a brake booster. This master brake cylinder piston is also referred to as a primary piston or rod piston. One or more further master brake cylinder pistons are moved in the master brake cylinder bore by the brake pressure generated by the primary piston or rod piston. These master brake cylinder pistons are also referred to as secondary pistons or floating pistons.

The vehicle braking system includes a shutoff valve, which in particular is a solenoid valve and via which the master brake cylinder bore is hydraulically separable from the remainder of the vehicle braking system, in particular from brake circuits or the wheel brakes. According to the present invention, a receptacle for the shutoff valve is situated in the hydraulic block, between the upper side and the master brake cylinder.

When reference is made here to a valve or in general to a hydraulic component, its receptacle in the hydraulic block is also meant, regardless of whether or not the hydraulic block is equipped, i.e., whether or not the valve or the hydraulic component is situated in its receptacle.

Refinements and advantageous embodiments of the present invention are disclosed herein.

One example embodiment of the present invention provides a counterbore for connecting a wheel brake, a brake circuit, or a further hydraulic block of the vehicle braking system via a brake line. The connection takes place, for example, with the aid of a screw nipple or a press-in nipple. The counterbore that forms the connection for the brake fluid line is provided between the upper side and the master brake cylinder, in a side of the hydraulic block adjoining the upper side and in parallel to the master brake cylinder. This side is referred to here as the "motor side."

A receptacle for a check valve may be situated in a space-saving manner in a base of the counterbore that forms the connection for the brake fluid reservoir. One example embodiment of the present invention provides that three bores in the hydraulic block connect the check valve or the receptacle for the check valve to the connection for the brake fluid line. A first bore leads from the receptacle for the check valve, in parallel to the upper side of the hydraulic block, to a second bore that extends perpendicularly with respect to the upper side of the hydraulic block, in the direction of the upper side. The second bore leads to a third bore which opens perpendicularly into a base of the connection for the brake fluid line.

For the powered generation of a brake pressure, one example embodiment of the present invention provides a power brake pressure generator that includes a power cylinder bore in the hydraulic block, in which a power piston is movable, for example via a screw drive using an electric motor or using some other rotational/translational conversion gear. A mechanical reduction gear may be provided between the electric motor and the screw drive. The electric motor and the screw drive form an electromechanical power drive for power piston, and together with the power piston and the power cylinder bore form an electromechanical power brake pressure generator; the present invention does not exclude something other than electromechanical power brake pressure generators. The power piston may be directly displaceably guided in the power cylinder bore or indirectly, for example in a cylinder bushing. The power cylinder bore is a bore in the hydraulic block, and in particular is situated in the motor side and thus perpendicular to the master brake cylinder. The power cylinder bore is in particular situated on a side of the master brake cylinder in the hydraulic block facing away from the upper side of the hydraulic block.

In the present context, through holes or blind holes referred to as "bores" or as "cylinder bores" may also be produced in some way other than boring.

Also possible are embodiments of the present invention without a shutoff valve, or with a shutoff valve that is situated at some other location in the hydraulic block than stated above.

All features disclosed in the description and the figures may be implemented individually or in basically any combination in specific embodiments of the present invention. Embodiments of the present invention that do not include all, but instead only one or more, features of a specific embodiment of the present invention are possible in principle.

BRIEF DESCRIPTION OF THE DRAWINGS

The present invention is explained in greater detail below based on one specific example embodiment shown in the figures.

Figure 2:
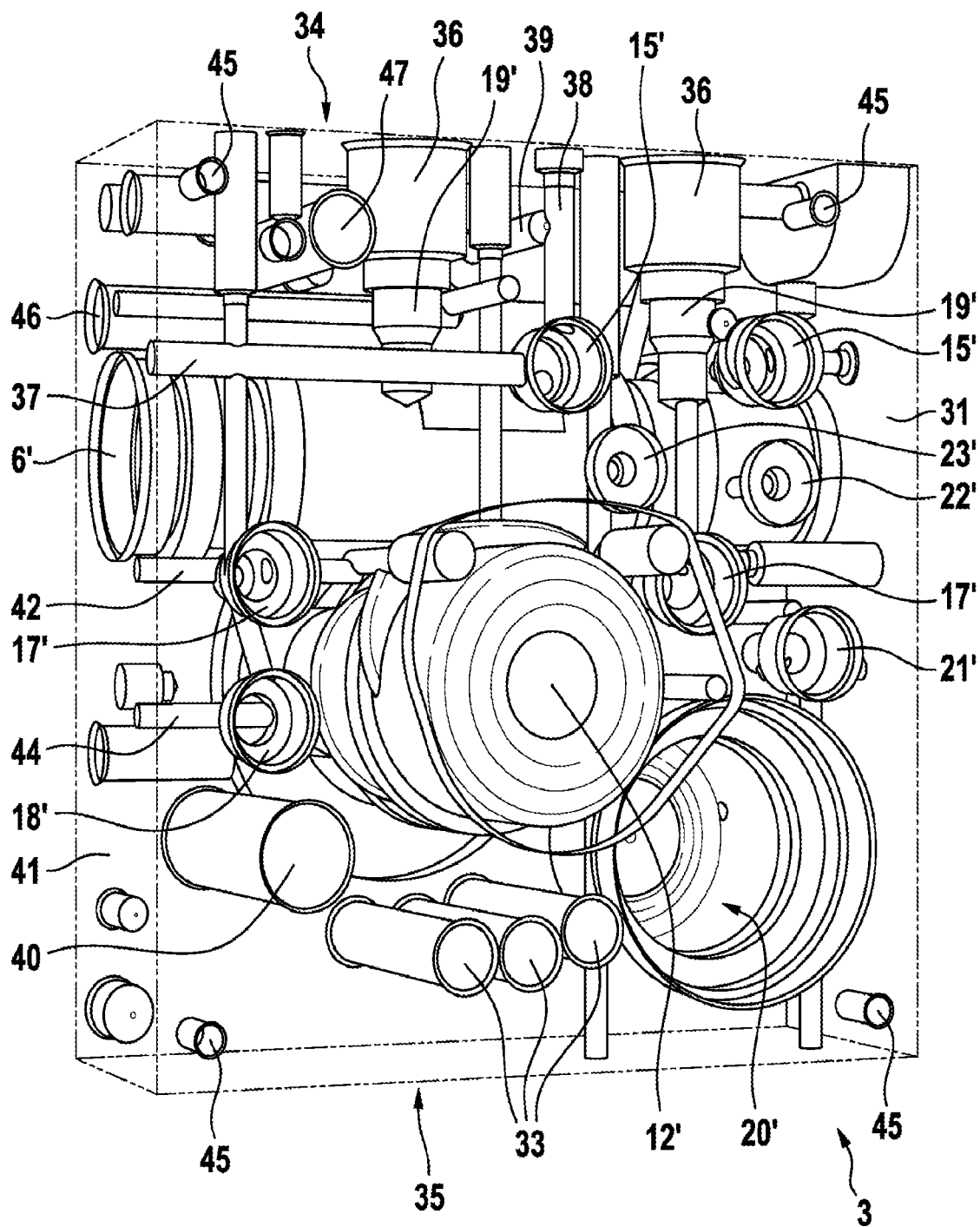
FIG. 2 shows a hydraulic block according to the present invention of the vehicle power braking system from FIG. 1 in a perspective illustration.
Figure 3:
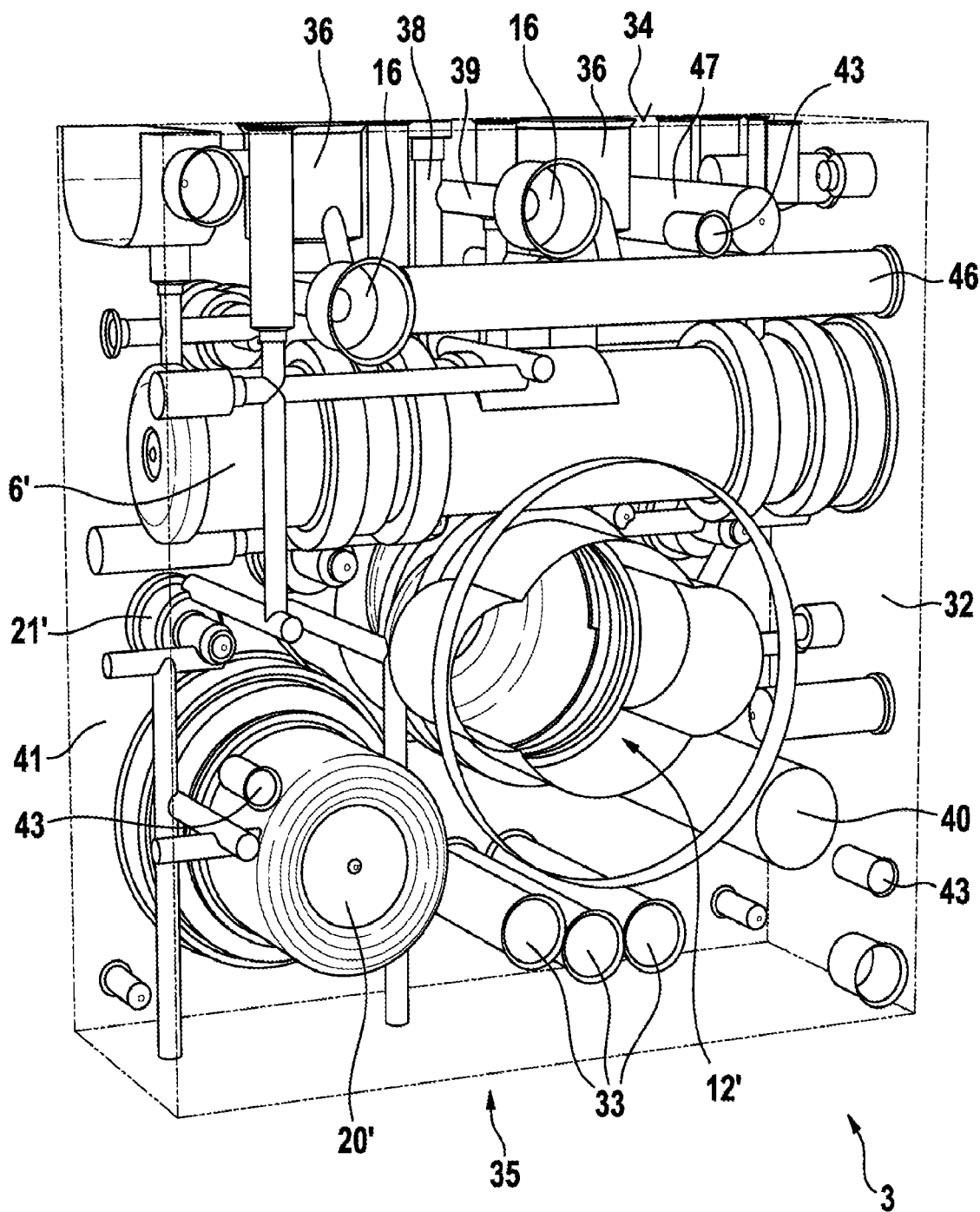
FIG. 3 shows the hydraulic block from FIG. 2 with a view of an opposite side.

The hydraulic block is depicted in a phantom view in FIGS. 2 and 3 in order to show its boring.

DETAILED DESCRIPTION OF EXAMPLE EMBODIMENTS

Figure 1:
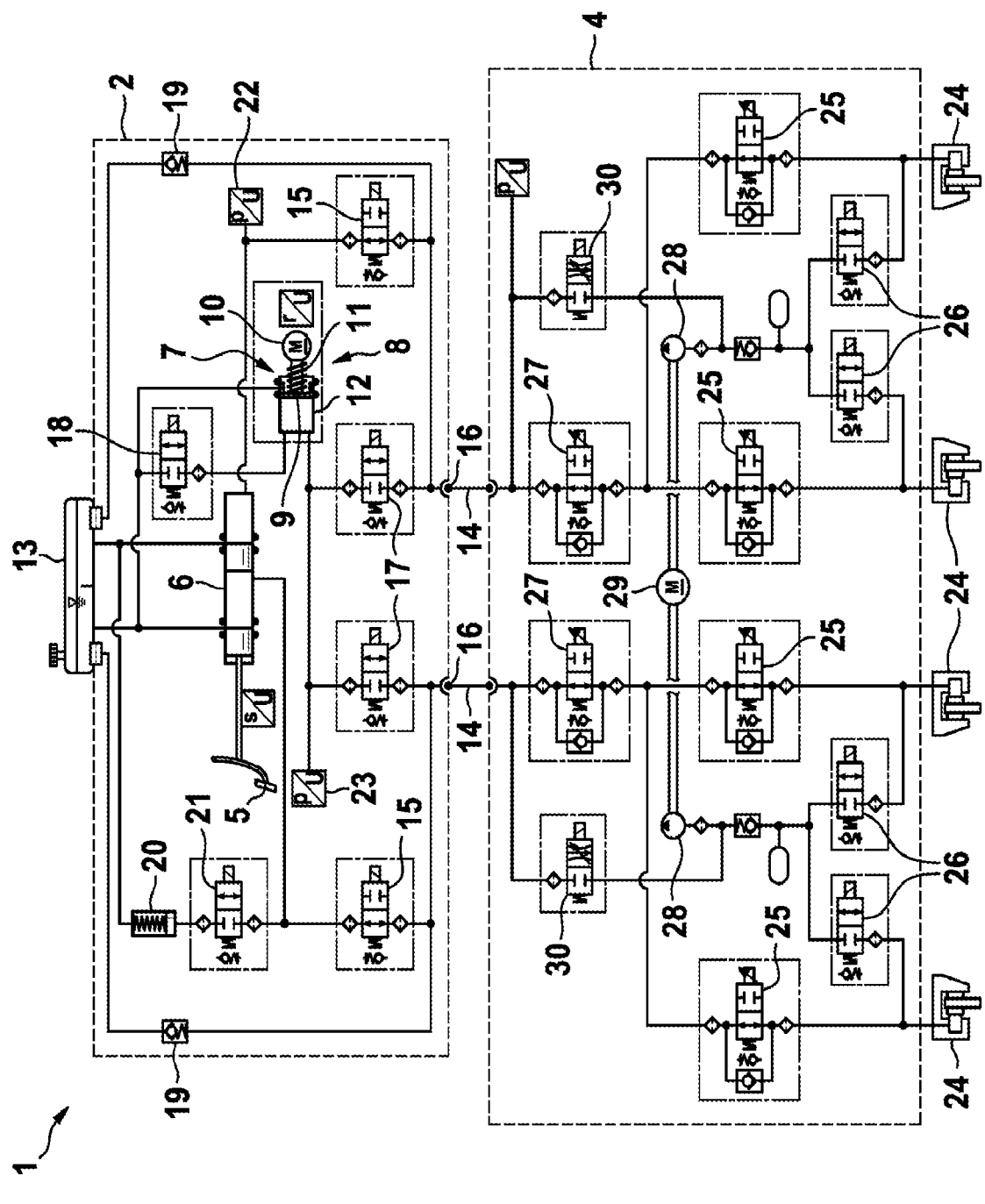
FIG. 1 shows a hydraulic circuit diagram of a hydraulic vehicle power braking system in accordance with an example embodiment of the present invention.

FIG. 1 shows a hydraulic dual-circuit vehicle power braking system 1 that includes a pressure generation module 2 accommodated in a first hydraulic block 3, and a pressure control module 4 accommodated in a second hydraulic block. FIGS. 2 and 3 show first hydraulic block 3 according to the present invention in perspective illustrations, with a view of respectively opposite sides of hydraulic block 3. Hydraulic block 3 is depicted in a phantom view so that its boring is visible. The second hydraulic block is not shown.

Vehicle braking system 1 includes a dual-circuit master brake cylinder 6 that is actuatable by muscular power with the aid of a foot brake pedal 5, and a power brake pressure generator 7 including a piston-cylinder unit 8 whose piston 9 is displaceable in a cylinder 12 of piston-cylinder unit 8 via a screw gear 11, using an electric motor 10, in order to generate a brake pressure. Piston-cylinder unit 8 or power brake pressure generator 7 may also be referred to overall as a plunger unit, its piston 9 as a plunger piston, and its cylinder 12 as a plunger cylinder.

A brake fluid reservoir 13 to which the two chambers of master brake cylinder 6 are connected is mounted on hydraulic block 3.

Pressure control module 4 is connected to pressure generation module 2 via a brake line 14 for each brake circuit. Each chamber of master brake cylinder 6 is connected to connections 16 of first hydraulic block 3 via a shutoff valve 15, and brake lines 14 for pressure control module 4 are connected to connections 16.

Cylinder 12 of power brake pressure generator 7 is connected to connections 16 for pressure control module 4 via power valves 17. In addition, cylinder 12 of power brake pressure generator 7 is directly and additionally connected to brake fluid reservoir 13 via a pressure relief valve 18.

Brake fluid reservoir 13 is connected to connections 16 for pressure control module 4 via check valves 19, through which flow passes in the direction from brake fluid reservoir 13 to pressure control module 4.

A pedal travel simulator 20 is connected to a first chamber of master brake cylinder 6 via a simulator valve 21. Pedal travel simulator 20 is a piston-cylinder unit with a spring-loaded piston; brake fluid is displaceable from master brake cylinder 6 into the piston-cylinder unit when simulator valve 21 is open, to allow foot brake pedal 5 to move when shutoff valves 15 are closed upon powered actuation of vehicle braking system 1.

A pressure sensor 22 is connected to a second chamber of master brake cylinder 6, and a pressure sensor 23 is connected to cylinder 12 of power brake pressure generator 7.

The components of vehicle braking system 1 described thus far are parts of pressure generation module 2, and are accommodated in first hydraulic block 3. In FIGS. 2 and 3, the reference numerals for the receptacles for the components are supplemented with a "'" symbol.

Service braking takes place as powered braking, in which a brake pressure is generated using power brake pressure generator 7. For this purpose, power valves 17 are opened and shutoff valves 15 are closed. Master brake cylinder 6 is used as a setpoint generator for the brake pressure that is to be generated. Auxiliary braking in the event of failure of power brake pressure generator 7 is possible using master brake cylinder 6.

For each wheel brake 24, an inlet valve 25 and an outlet valve 26 are situated in the hydraulic block (not illustrated) of pressure control module 4. The components of vehicle braking system 1 described below are also accommodated in the hydraulic block (not illustrated) of pressure control module 4. Wheel brakes 24 are connected to the hydraulic block of pressure control module 4 via brake lines. In the illustrated exemplary embodiment, vehicle braking system 1 includes two wheel brakes 24 in each brake circuit, and thus a total of four wheel brakes 24, and likewise includes four inlet valves 25 and four outlet valves 26. In each brake circuit, inlet valves 25 are connected to respective connection 16 of first hydraulic block 3 of pressure generation module 2 via a connection valve 27 and brake lines 14.

Outlet valves 26 connect wheel brakes 24 to suction sides of hydropumps 28, which may also be referred to as recirculation pumps. Vehicle braking system 1 includes a hydropump 28 in each brake circuit, the hydropumps being jointly drivable via an electric motor 29. Pressure sides of hydropumps 28 are connected between connection valves 27 and inlet valves 25.

Hydropumps 28, inlet valves 25, and outlet valves 26 form brake pressure control valve systems via which slip control systems such as an antilock braking system, traction control system, and vehicle dynamics control/electronic stability program may be carried out for each individual wheel. These slip control systems are typically abbreviated as ABS, TCS, and VDC/ESP, respectively. Such slip control systems are conventional and are not discussed further here.

The suction sides of hydropumps 28 are connected via second intake valves 30 to brake lines 14, which connect pressure control module 4 to the hydraulic block of pressure generation module 2.

Unlike the illustration, vehicle braking system 1 may also include only one hydraulic block or may be subdivided into three or more modules that are accommodated in three or more hydraulic blocks (not illustrated). At least two mutually independent power supplies and at least two mutually independent electronic control units for controlling the valves and electric motors 10, 29 are present for redundant operation of vehicle braking system 1.

Shutoff valves 15, power valves 17, pressure relief valves 18, 30, simulator valve 20, inlet valves 25, outlet valves 26, and connection valves 27 are 2/2-way solenoid valves; shutoff valves 15, inlet valves 25, and connection valves 27 in their de-energized basic positions are open, and power valves 17, pressure relief valves 18, 30, simulator valve 20, and outlet valves 26 in their de-energized basic positions are closed. The solenoid valves are or become situated in counterbores of hydraulic blocks 3 forming receptacles for the valves. Armatures of the valve domes containing solenoid valves protrude from hydraulic blocks 3, and solenoids for actuating the solenoid valves are mounted on the armatures.

Hydraulic block 3 according to the present invention, shown in a phantom view, of pressure generation module 2 of vehicle power braking system 1, shown in FIG. 2 with a view of a valve side 31, and in FIG. 3 with a view of a motor side 32, is used to mechanically fasten and hydraulically interconnect the hydraulic components of pressure generation module 2 of vehicle braking system 1 shown in FIG. 1. The components or their receptacles are situated at and in hydraulic block 3, and are hydraulically connected to one another via boring in hydraulic block 3 corresponding to the hydraulic circuit diagram in FIG. 1. Valve side 31 and motor side 32 are the two oppositely situated large sides of cuboidal hydraulic block 3.

In the illustrated and described specific embodiment of the present invention, hydraulic block 3 is a cuboidal, flat metal block made of an aluminum alloy, for example, which is provided with bores for accommodating the components and bored corresponding to the hydraulic circuit diagram of the vehicle braking system and the slip control system. "Bored" means that hydraulic block 3 is provided with bores that connect the receptacles to one another corresponding to the hydraulic circuit diagram of the vehicle braking system. The bores are through holes, blind holes, and counterbores, which may also be produced in some way other than boring. They may have stepped diameters and circumferential grooves, which are not shown.

For master brake cylinder 6, hydraulic block 3 includes a master brake cylinder bore 6' situated in hydraulic block 3 in parallel to an upper side 34, in the center between valve side 31 and motor side 32. Upper side 34 is a narrow side of hydraulic block 3, and is situated at the top in a designated installation and use position of hydraulic block 3.

In the exemplary embodiment, master brake cylinder bore 6' is situated in hydraulic block 1 above a horizontal center plane, i.e., between the center plane and upper side 34. In the exemplary embodiment, master brake cylinder bore 6' is situated near the center plane. The horizontal center plane is situated in the center between upper side 34 and an oppositely situated lower side 35 of hydraulic block 1.

Parallel to and near master brake cylinder bore 6', hydraulic block 3 has a significantly thinner bore as a position sensor bore 46 for a master brake cylinder piston (primary piston or rod piston). Immerged into position sensor bore 46 is a rod-shaped sensor holder that is mounted on a piston rod, outside hydraulic block 3, that is connected to the master brake cylinder piston (not illustrated), so that the sensor holder moves together with the master brake cylinder piston. For example, a permanent magnet as signal generator, situated in position sensor bore 46, is fastened to the sensor holder. In the exemplary embodiment, position sensor bore 46 is situated approximately at an intersection line of two imaginary tangential surfaces of master brake cylinder bore 6', whose one tangential surface is in parallel to valve side 31, and whose other tangential surface is in parallel to upper side 34 of hydraulic block 3. Position sensor bore 46 is open on the same narrow side 41 of hydraulic block 3 as master brake cylinder bore 6', and in the exemplary embodiment has approximately ⅔ to ¾ the length of the latter.

Two counterbores as connections 36 for brake fluid reservoir 13, not shown in FIGS. 2 and 3, are situated in upper side 34. Brake fluid reservoir 13 is mounted on upper side 34 of hydraulic block 3. The brake fluid reservoir includes two connection nipples at its lower side, which are inserted in a fluid-tight manner into connections 36 of hydraulic block 3 when brake fluid reservoir 13 is mounted on upper side 34 of hydraulic block 3.

Between the one connection 36 for brake fluid reservoir 13 and narrow side 41, at which master brake cylinder bore 6' is open, hydraulic block 3 includes a position sensor bore 47 for a position sensor, not shown, which measures the position of the signal generator and thus indirectly measures the position of the master brake cylinder piston. The position sensor is a Hall sensor, for example, via which the position is ascertainable from an angle of magnetic field lines of the signal generator. In the exemplary embodiment, position sensor bore 47 is mounted in valve side 31 of hydraulic block 3, near connection 36 for brake fluid reservoir 13 and near position sensor bore 46.

In valve side 31, hydraulic block 3 includes two counterbores as receptacles 15' for shutoff valves 15, which are connected to the master brake cylinder or master brake cylinder bore 6' and to the two connections 16 of the two brake circuits of the hydraulic block, not illustrated, of pressure control module 4 via bores, not shown, in hydraulic block 3. Connections 16 for pressure control module 4 are designed as counterbores in motor side 32 of hydraulic block 3. Connections 16 for pressure control module 4 are situated near upper side 34 of hydraulic block 3 and near and between connections 36 for brake fluid reservoir 13. Receptacles 15' for shutoff valves 15 are situated near master brake cylinder bore 6', between same and upper side 34 of hydraulic block 3, and likewise between connections 36 for brake fluid reservoir 13. Brake lines 14 may be connected to connections 16 via nipples, not illustrated. The nipples may be screw nipples or self-clinching press-in nipples, for example.

In each case, one of check valves 19, through which the brake fluid may flow from the brake fluid reservoir into the boring of hydraulic block 1, i.e., into the vehicle braking system, but not in the reverse direction, is situated in an extension 19' in the base of the counterbores that form connections 36 for brake fluid reservoir 13.

Counterbores 19' for accommodating check valves 19 are in each case connected to connections 16 for pressure generation module 2 via three bores 37, 38, 39, of which a first bore 37 leads from counterbore 19' in parallel to upper side 34 of hydraulic block 3 to a second of the three bores 38. Second bore 38 extends perpendicularly with respect to upper side 34 of hydraulic block 3, from first bore 37 in the direction toward upper side 34. A third bore 39 leads from second bore 38, perpendicularly with respect to motor side 32 of hydraulic block 3, into connection 16 for pressure control module 4.

Hydraulic block 3 includes a through hole, perpendicular to valve side 31 and perpendicular to motor side 32, as a power cylinder bore 12' which forms cylinder 12 of power brake pressure generator 7. Electric motor 10, not shown in FIGS. 2 and 3, of power brake pressure generator 7 may be situated coaxially with respect to power cylinder bore 12' at motor side 32, on the outside of hydraulic block 3. Screw gear 11, for example a ball screw drive or in general a rotational/translational conversion gear, is situated between electric motor 10 and the piston of power brake pressure generator 7. A mechanical reduction gear, for example a planetary gear, may be situated between electric motor 10 and screw gear 11.

For fastening electric motor 10, not illustrated, to hydraulic block 3, hydraulic block 3 includes three fastening holes 43 provided in motor side 32 of hydraulic block 3 in a uniform or nonuniform distribution around power cylinder bore 12'. In the exemplary embodiment, fastening holes 43 are blind holes and may have female threads. Only two oppositely situated fastening holes or more than three fastening holes (not illustrated) are also possible.

For fastening an electronic control unit, not illustrated, hydraulic block 3 includes fastening holes 45 in valve side 31. In the exemplary embodiment, fastening holes 45 for the electronic control unit are likewise blind holes which may have female threads. In the exemplary embodiment, four fastening holes 45 are situated in valve side 31 of hydraulic block 3 near the corners. A different number and/or arrangement are/is possible.

In the exemplary embodiment, power cylinder bore 12' is situated approximately centrally in motor side 32, and extends tangentially with respect to master brake cylinder bore 6' below master brake cylinder bore 6', i.e., through hydraulic block 3 on a side of master brake cylinder bore 6' facing lower side 35 of hydraulic block 3. In the exemplary embodiment, power cylinder bore 12' is situated near the center between two narrow sides 41 of hydraulic block 3 adjoining upper side 34, with power cylinder bore 12' covering the center.

Three through holes passing through from valve side 31 to motor side 32, as motor connection bores 33 for supplying power to electric motor 10 of power brake pressure generator 7, are mounted in hydraulic block 3, between power cylinder bore 12' and lower side 35. Motor connection bores 33 are mounted in hydraulic block 3 on an imaginary arc around power cylinder bore 12', between same and lower side 35.

In addition, hydraulic block 3 includes a signal bore 40 for control lines and/or signal lines to or from electric motor 10. Via signal bore 40, for example a rotational angle sensor of electric motor 10 may be connected to the electronic control unit situated on valve side 31 of hydraulic block 3. Signal bore 40 passes through from valve side 31 to motor side 32, and is situated between a narrow side 41 and lower side 35 of hydraulic block 3, between power cylinder bore 12' and a corner of hydraulic block 3.

In valve side 31, hydraulic block 3 includes two counterbores as receptacles 17' for power valves 17 situated on both sides next to power cylinder bore 12', tangentially with respect to master brake cylinder bore 6' at its side facing lower side 35 of hydraulic block 3.

For connecting receptacles 17' for power valves 17 to power cylinder bore 12', hydraulic block 3 includes a bore 42 that opens tangentially or in a secant direction into power cylinder bore 12' and leads to receptacles 17' for power valves 17 on both sides of power cylinder bore 12'. In the exemplary embodiment, bore 42 extends in parallel to master brake cylinder bore 6' near its side facing away from lower side 35 of hydraulic block 3.

A flat counterbore as a receptacle 22' for pressure sensor 22 of master brake cylinder 6 is situated in hydraulic block 3 in valve side 31. From the base of the flat counterbore, a bore opens into master brake cylinder bore 6'.

A flat counterbore as a receptacle 23' for pressure sensor 23 for power cylinder bore 12' is situated in valve side 31 of hydraulic block 3, radially or essentially radially with respect to master brake cylinder bore 6' in hydraulic block 3. The flat counterbore is connected via a bore to power cylinder bore 12', which opens into bore 42 that connects receptacles 17' for power valves 17 to power cylinder bore 12'.

A counterbore as a receptacle 18' for pressure relief valve 18 is situated in valve side 31 of hydraulic block 3 next to power cylinder bore 12'. In the exemplary embodiment, receptacle 18' for pressure relief valve 18 is situated underneath, i.e., at a distance from and on a side of one of the two receptacles 17' for power valves 17 facing lower side 35 of hydraulic block 3. A bore 44 that opens tangentially or in a secant direction into power cylinder bore 12' connects receptacle 18' for pressure relief valve 18 to the power cylinder or to power cylinder bore 12'. It is possible to exchange receptacles 17', 18' for one of the two power valves 17 and pressure relief valve 18 on one side of power cylinder bore 12'; i.e., receptacle 18' for pressure relief valve 18 is situated nearer to upper side 34, and receptacle 17' for the one power valve 17 is situated nearer to lower side 35, of hydraulic block 3 (not illustrated). The boring of hydraulic block 3 must be adapted.

In addition, hydraulic block 3 includes a pedal travel simulator cylinder bore 20' for pedal travel simulator 20. In the exemplary embodiment, pedal travel simulator cylinder bore 20' is a blind hole situated between master brake cylinder bore 6' and lower side 35 of hydraulic block 3, next to power cylinder bore 12', somewhat in the direction of lower side 35 toward power cylinder bore 12' in valve side 31 of hydraulic block 3.

A counterbore as a receptacle 21' for simulator valve 21 is situated in valve side 31 of hydraulic block 3 between master brake cylinder bore 6' and pedal travel simulator cylinder bore 20', near a vertical narrow side 41 of hydraulic block 3 adjoining upper side 34.

What is claimed is:

1. A hydraulic block for a hydraulic unit of a hydraulic vehicle power braking system, comprising a master brake cylinder bore and a power cylinder bore, the hydraulic block having a connection for a brake fluid reservoir at an upper side of the hydraulic block, and the master brake cylinder bore being situated in the hydraulic block in parallel to the upper side, and including a receptacle for a shutoff valve via which the master brake cylinder bore is hydraulically separable from the remainder of the vehicle braking system, wherein the receptacle for the shutoff valve is situated in the hydraulic block such that a vertical coordinate of at least part of the receptable for the shutoff valve is between a vertical coordinate of the upper side and a vertical coordinate of a top of the master brake cylinder bore.

2. The hydraulic block as recited in claim 1, wherein the connection for the brake fluid reservoir is a counterbore in the upper side of the hydraulic block, and a base of the counterbore is a receptacle for situation therein of a check valve.

3. The hydraulic block as recited in claim 2, wherein the hydraulic block includes a counterbore as a connection for a brake fluid line to a pressure control module of the vehicle braking system in a motor side of the hydraulic block adjoining the upper side of the hydraulic block and in parallel to the master brake cylinder bore, between the upper side and the master brake cylinder bore, and the check valve is connected to the connection for the brake line via three bores, of which a first bore leads from the receptacle for the check valve, in parallel to the upper side of the hydraulic block, to a second bore which extends perpendicularly with respect to the upper side of the hydraulic block in a direction of the upper side of the hydraulic block and which leads to a third bore, which perpendicularly with respect to the motor side opens into a base of the connection for the brake line to the pressure control module in the motor side of the hydraulic block.

4. The hydraulic block as recited in claim 1, further comprising a connection for a brake line, wherein:
(I) the power cylinder bore is:
  (a) on a side of the master brake cylinder bore facing a bottom side of the hydraulic block; and
  (b) in a motor side of the hydraulic block;
(II) the motor side (a) adjoins the upper side and (b) is parallel to the master brake cylinder bore;
(III) the hydraulic block further comprises:
  (a) a receptacle for a power valve; and
  (b) a bore that opens tangentially or in a secant direction into the power cylinder bore and that connects the receptacle for the power valve to the power cylinder bore;
(IV) the receptable for the power valve is situated (a) in a motor side of the hydraulic block and (b) in parallel to the power cylinder bore;
(V) the power cylinder bore is connectable, via the receptacle for the power valve, to the connection for the brake line; and
(VI) the brake line is to a pressure control module of the vehicle braking system.

5. The hydraulic block as recited in claim 4, wherein the hydraulic block includes a receptacle for a pressure sensor for a power cylinder that is insertable into the power cylinder bore, which is situated in the motor side of the hydraulic block between the master brake cylinder bore and the motor side, and which via a bore is connected to the power cylinder bore that opens into the bore that connects the receptacle for the power valve to the power cylinder bore.

6. The hydraulic block as recited in claim 1, wherein the receptacle for the shutoff valve is situated in the hydraulic block in parallel to the upper side, laterally offset with respect to the connection for the brake fluid reservoir and/or tangentially with respect to the master brake cylinder bore.

7. The hydraulic block as recited in claim 1, wherein the hydraulic block includes a receptacle for a pressure sensor for the master brake cylinder, the receptacle being situated in a motor side of the hydraulic block and being connected to the master brake cylinder bore via a bore that leads from a base of the receptacle into the master brake cylinder bore.

8. The hydraulic block as recited in claim 1, wherein:
(I) the power cylinder bore is:
  (a) on a side of the master brake cylinder bore that faces a bottom side of the hydraulic block; and
  (b) in a motor side of the hydraulic block that adjoins the upper side and that is parallel to the master brake cylinder bore; and
(II) the hydraulic block further comprises:
  (a) a receptacle for a pressure relief valve (i) that is situated in the motor side and in parallel to the power cylinder bore, and (ii) via which the power cylinder bore is connectable to the connection for the brake fluid reservoir; and
  (b) a bore that opens tangentially or in a secant direction into the power cylinder bore and that connects the receptacle for the pressure relief valve to the power cylinder bore.

9. The hydraulic block as recited in claim 1, wherein the hydraulic block includes a pedal travel simulator cylinder bore on a side of the master brake cylinder bore facing the lower side of the hydraulic block in a valve side of the hydraulic block adjoining the upper side and in parallel to the master brake cylinder bore, and a receptacle for a simulator valve in a motor side of the hydraulic block, opposite from the valve side, between the pedal travel simulator cylinder bore and the master brake cylinder bore.

10. The hydraulic block as recited in claim 1, wherein the hydraulic block includes one or more motor connection bores, for supplying electrical power to an electric motor of a power brake pressure generator, between the power cylinder bore and the lower side of the hydraulic block, and/or includes a signal bore between the power cylinder bore and a corner of the hydraulic block.

11. The hydraulic block as recited in claim 1, wherein the hydraulic block includes a position sensor bore situated in parallel to the master brake cylinder bore, near the master brake cylinder bore.

12. A system comprising:
a first hydraulic block, which is a pressure generator module for a hydraulic unit of a hydraulic vehicle power braking system, the first hydraulic block comprising a master brake cylinder bore and a power cylinder bore, the first hydraulic block having a connection for a brake fluid reservoir at an upper side of the first hydraulic block, and the master brake cylinder bore being situated in the first hydraulic block in parallel to the upper side, and including a receptacle for a shutoff valve via which the master brake cylinder bore is hydraulically separable from the remainder of the vehicle braking system, wherein the receptacle for the shutoff valve is situated in the first hydraulic block, between the upper side and the master brake cylinder bore; and a pressure control module for the hydraulic unit and that is separate from, but hydraulically connected to, the first hydraulic block.

13. The system as recited in claim 12, wherein the pressure control module is embodied as a second hydraulic block.

14. The system as recited in claim 12, wherein inlet and outlet valves of wheel brakes, a fluid accumulator, and a pressure damper are all accommodated in the pressure control module and not in the first hydraulic block.

15. A system comprising:
- a first hydraulic block, which is a pressure generator module for a hydraulic unit of a hydraulic vehicle power braking system, the first hydraulic block comprising a master brake cylinder bore and a power cylinder bore, the hydraulic block having a connection for a brake fluid reservoir at an upper side of the hydraulic block, and the master brake cylinder bore being situated in the hydraulic block in parallel to the upper side, and including a receptacle for a shutoff valve via which the master brake cylinder bore is hydraulically separable from the remainder of the vehicle braking system, wherein the receptacle for the shutoff valve is situated in the hydraulic block such that a vertical coordinate of at least part of the shutoff valve is between a vertical coordinate of the upper side and a vertical coordinate of a top of the master brake cylinder bore; and
- a second hydraulic block, which is a pressure control module for the hydraulic unit, the second hydraulic block being hydraulically connected to the first hydraulic block and including receptacles for inlet and outlet valves of wheel brakes.

* * * * *